Jan. 2, 1945.    G. W. BATCHELDER ET AL    2,366,309
APPARATUS FOR THE TREATMENT OF WASTE ACID
Original Filed April 17, 1941
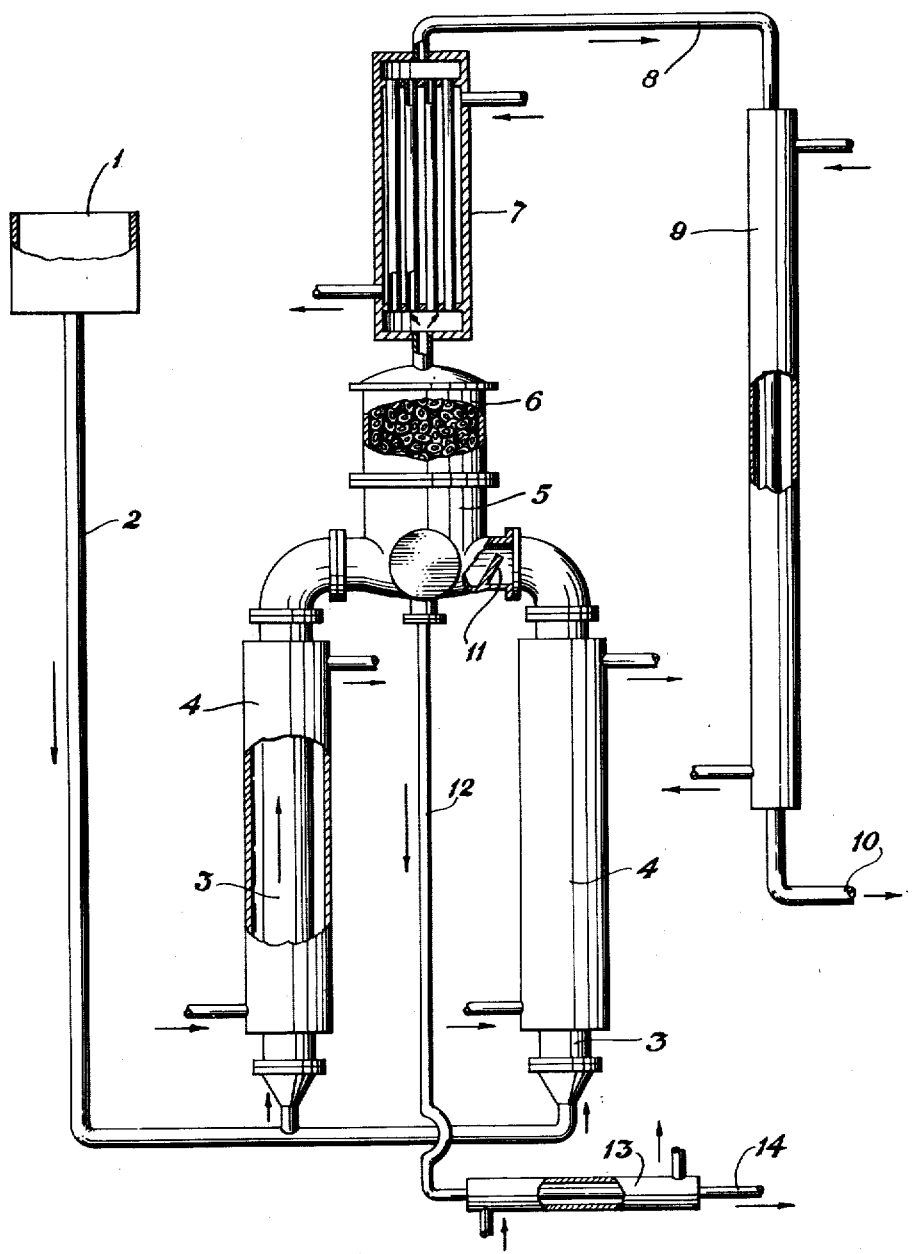
G. W. Batchelder
R. L. Featherer    INVENTORS
J. E. Hughes
BY  Thos. A. Wilson
ATTORNEY Patented Jan. 2, 1945

2,366,309

UNITED STATES PATENT OFFICE 2,366,309

APPARATUS FOR THE TREATMENT OF WASTE ACID

George W. Batchelder, Mantua, Ralph L. Featherer, Wenonah, and Jesse E. Hughes, Bridgeport, N. J., assignors to E. I. du Pont de Nemours & Company, Wilmington, Del., a corporation of Delaware Original application April 17, 1941, Serial No. 389,022. Divided and this application August 6, 1942, Serial No. 453,812

5 Claims. (Cl. 23—263)

This invention pertains to a new and improved process and apparatus for handling waste acid resulting from the production of trinitrophenyl methyl nitramine, commonly referred to as tetryl.

This application is a division of copending application Ser. No. 389,022, filed April 17, 1941, now Patent 2,337,025, issued Dec. 21, 1943.

The usual production of tetryl involves the nitration of dimethyl aniline sulfate by means of a mixed acid containing nitric and sulfuric acids. The waste acid resulting from the operation is always characterized by the presence of varying amounts of tetryl. The presence of this material renders it impracticable to treat the waste acid according to known processes for recovering a usable acid therefrom. Thus, the waste acid cannot be denitrated by passing steam therethrough, because the tetryl is not only explosive in nature, but in addition is not decomposed readily at the prevailing temperatures. As a result, the usual denitration processes fail to cause decomposition of the tetryl to non-explosive constituents. Moreover, upon denitration of the spent acid, some of the tetryl is carried over with the removed nitric acid. Its presence in this material renders the nitric unsafe for many uses. At the same time, the tetryl present in the residual sulfuric acid likewise renders it unsuited for many purposes. Because of this characteristic, the acid resulting from the tetryl process has presented a serious recovery problem.

The object of the present invention is a new and improved process for recovering both nitric and sulfuric acid from the spent acid resulting from the production of tetryl. Another object is a novel process and apparatus for recovering nitric and sulfuric acids from tetryl waste acid, which is characterized by safety of operation. A further object is a process for recovering nitric and sulfuric acids from tetryl waste acid, said process being characterized by the fact that the tetryl present in the waste acid is destroyed quickly and a substantial portion of the decomposition products thereof are converted to nitric acid. A still further object is a process and apparatus for handling tetryl waste acid, said process and apparatus being adapted to the facile elimination of tetryl from said waste acid, while permitting substantially complete recovery of the available nitric and sulfuric acids present therein.

We have found that the foregoing objects are attained by heating the tetryl waste acid for a period of time sufficient to permit substantial decomposition of the tetryl present, while simultaneously collecting the volatilized constituents and cooling them sufficiently to condense the nitric acid therefrom. Thus, the waste acid containing sulfuric acid, nitric acid, nitrososulfuric, and tetryl, when subjected to a temperature of 160° C. for, say, 15 minutes, unexpectedly is characterized by decomposition of the tetryl and the production of a substantially water-white acid mixture. The process and apparatus may be described more clearly by referring to the accompanying drawing, Fig. 1, which shows a vertical view in cross section of a preferred embodiment of the apparatus.

The numeral 1 refers to a constant level supply tank into which the tetryl waste acid is introduced. A regulated feed of this acid is passed via the line 2 into parallel acid-resistant tubes 3. Heating of the acid during its passage through these tubes is effected by means of the jackets 4, which are connected to a suitable steam supply. The upper extremities of these tubes are connected to a common header 5. Inserted in each of the tubes 3 is a dam 11 adapted to restrict the flow of acid therein. Superimposed on the header 5 is a section 6 which likewise is composed of acid-resistant material and which is packed with rings of suitable size. The top of this packed column is connected with the vertical condenser 7, said condenser being provided with an exit line 8 through which the uncondensed gases pass. The exit line 8 is provided with a cooling jacket 9, the cooled gases exiting from the line at 10. The purified acid mixture exits from the header 5 by means of the line 12, the acid mixture being cooled by means of the cooler 13 and exiting at 14.

The tetryl waste acid is fed through the line 2 at a rate of flow which permits heating this material to the desired temperature for the time necessary to permit decomposition of substantially all the tetryl present. The time of heating, of course, is influenced by the temperature to which the acid is heated. Thus, a preferred embodiment of the present invention contemplates controlling the rate of feed so that the waste acid will be subjected to a temperature of about 180° C. for approximately 15 minutes. In those cases where a lower temperature than 180° C. is employed, or where it is deemed essential to employ a factor of safety, the time interval naturally will be greater. The necessary temperature conditions may be attained readily by means of steam at 250 lbs. pressure. Heating of the tetryl waste acid is accompanied by substantial evolution of oxides of nitrogen, together with the volatilization of an appreciable quantity of the nitric acid present. These volatilized constituents pass through the ring-packed tower and travel to the water-cooled condenser, which is designed to effect condensation of any nitric acid present in the vapors. The condensed nitric acid in effect is refluxed, and drops back into the header 5 where it is reunited with the residual sulfuric acid and passes down through the line and through the cooler as a water-white nitric-sulfuric acid mixture.

The following example sets forth a specific embodiment of the invention:

Example 1

16,000 lbs. of tetryl waste acid, containing a sulfuric content of 64.08% total sulfuric (10,250 lbs.), 21.42% nitric acid (3433 lbs.), 0.43% of nitrated material consisting essentially of tetryl, and 2317 lbs. of water, were fed into apparatus of the type described hereinabove, but which was characterized by four acid-resistant tubes joined to a common header. Each of the tubes was heated by means of steam having a pressure of 250 lbs./sq. in. The rate of flow of the tetryl waste acid into said tubes was so regulated that it was subjected to a heating action for approximately 45 minutes. The temperature of the acid exiting from each of the jacketed acid-resistant tubes averaged about 185° C. throughout the operation. The volatilized constituents passed up into the ring-packed column and condenser, the latter member being cooled by means of water, thereby causing condensation of the nitric acid, which flowed back into the header and exited with the purified residual sulfuric acid. The nitric-sulfuric acid mixture was cooled to a temperature of about 40° C. and sent to storage. The uncondensed oxides of nitrogen gases leaving the upper part of the condenser at about 60° C. were cooled further, following which they were passed into an absorption tower. The gases leaving the condenser represented 3538 lbs. of 60% nitric acid. The water-white purified sulfuric-nitric acid mixture exiting from the system weighed 13,133 lbs., said acid mixture being composed of 1197 lbs. of nitric acid, 10,250 lbs. of sulfuric acid, and 1686 lbs. of water. The very high efficiency obtained is evident from the yield of nitric and sulfuric acids recovered.

It will be understood that the time interval during which the tetryl waste acid is heated may be varied rather widely. Likewise, the present process is operative through a rather wide range of temperatures. We prefer, however, to subject the waste acid to a temperature of between 135° C. and 200° C., because these temperatures yield an acid mixture of superior appearance, and can be obtained economically. Likewise, the temperature at which the condenser is operated is not definitely fixed but will depend upon the construction materials employed, particularly with respect to their resistance to corrosion when in contact with nitric acid.

Various uses may be found for the purified sulfuric acid mixture formed in accordance with the present invention, as well as for the nitric acid which is produced by absorption of the oxides of nitrogen exiting from the condenser. We prefer to blend the nitric acid with the sulfuric-nitric acid mixture and then butt up the resultant mixture to a composition deemed suitable for treatment in known nitric acid concentrators, which are employed to produce concentrated nitric acid and sulfuric acid. This preference is due to the fact that the sulfuric-nitric acid mixture made available in the present case requires only the addition of some concentrated sulfuric acid to render it suitable for use in known nitric acid concentration processes. It will be understood, however, that the nitric acid may be separated and the nitric and sulfuric acids be used separately, if such be desired.

The present process and apparatus permits the recovery of substantially all the available acids in tetryl waste acid without necessitating undue hazards. Moreover, the acids recovered not only are of a suitable composition, but in addition are entirely satisfactory in appearance, since they are water-white. By operating in accordance with the present process, it is possible to destroy substantially all the tetryl present in the waste acid. Indeed, the breakdown or decomposition of the tetryl furnishes oxides of nitrogen which are converted to nitric acid. This process is particularly advantageous since it does not entail the dilution of acids, which results when waste acid is denitrated in the usual manner, that is to say, by means of steam. Instead, the waste acid is converted to a pure acid mixture containing no more water than was originally present in the waste acid.

It will be understood that various modifications may be made from the foregoing description without departing from the spirit or scope of the invention. For instance, although the example given pertains to a continuous process, the waste acid may be treated in batches. Thus, it is feasible to employ heating media other than steam. Likewise, it is not essential that the acid-resistant heated tubes be of any specific number, but instead any number deemed suitable without complicating the design of the equipment unduly may be used. Likewise, it is not essential that the column be placed with any specific type of rings, since various known packing materials may be employed suitably. Nor is it essential that the oxides of nitrogen be cooled to produce nitric acid, because liquid nitrogen dioxide itself is very useful. We intend, therefore, to be limited only in accordance with the following claims.

We claim:

1. An apparatus adapted to the continuous purification of tetryl waste acid, said apparatus comprising means for feeding said acid at a controlled rate of flow including a constant level supply tank disposed at a level permitting gravity flow and a conduit therefrom, at least one acid-resistant container connected at its lower end to the aforesaid conduit and provided with heating means including an acid-resistant tube capable of heating the acid during its upward passage therethrough, a cooling section including a condenser capable of cooling the volatilized constituents to a temperature below the boiling point of nitric acid, a header intermediate to said acid-resistant container and cooling section, said header being dammed to permit intermingling of the condensed material with the residual and being provided with an exit for the purified acid mixture resulting.

2. An apparatus adapted to the continuous purification of tetryl waste acid, said apparatus comprising means for feeding said acid at a controlled rate of flow including a constant level supply tank disposed at a level permitting gravity flow and a conduit leading therefrom, a plurality of acid-resistant tubes connected in parallel at their lower ends with said feeding means through said conduit, said tubes being provided with means for heating the acid during its upward passage therethrough, a cooling section including a condenser, capable of cooling the volatilized constituents to a temperature below the boiling point of nitric acid, a header intermediate to said tubes and cooling section, said header being dammed to permit intermingling of the condensed material with the residual and being provided with an exit for the purified acid mixture resulting.

3. An apparatus adapted to the continuous purification of tetryl waste acid, said apparatus comprising means for feeding said acid at a controlled rate of flow including a constant level supply tank disposed at a level permitting gravity flow and a conduit leading therefrom, a plurality of acid-resistant tubes connected in parallel at their lower ends with said feeding means through said conduit, said tubes being provided with means for heating the acid during its upward passage therethrough, a cooling section including a condenser capable of cooling the volatilized constituents to a temperature below the boiling point of nitric acid and provided with an exit for the uncondensed gases, a header intermediate to said tubes and cooling section, said header being dammed to permit intermingling of the condensed material with the residual acid and being provided with an exit for the purified acid mixture resulting.

4. An apparatus adapted to the continuous purification of tetryl waste acid, said apparatus being provided with means for feeding the acid at a controlled rate of flow including a constant level supply tank disposed at a level permitting gravity flow and a conduit leading therefrom, a plurality of acid-resistant tubes connected in parallel at their lower ends to said feeding means through said conduit, said tubes being provided with means for heating the acid during its upward passage therethrough, a condenser adapted to cool the volatilized constituents to a temperature below the boiling point of nitric acid, a header intermediate to said tubes and condenser, said header being dammed to permit intermingling of said condensed material with the residual and being provided with an exit for the resulting acid mixture, a packed column between said header and said condenser.

5. An apparatus adapted for the continuous purification of tetryl waste acid, said apparatus comprising means for feeding said acid at a controlled rate of flow including a constant level supply tank disposed at a level permitting gravity flow and a conduit leading therefrom, said means being connected in parallel through said conduit to a plurality of acid-resistant tubes at their lower ends in such manner that the acid passes through said tubes in an upward direction, said tubes being provided with means for heating the acid during its passage therethrough and with dams situated in the upper extremities thereof for restricting the flow of liquids, a condenser capable of cooling the volatilized constituents to a temperature below the boiling point of nitric acid, thereby causing refluxing of the condensed nitric acid with the volatilized constituents, a header intermediate to said tubes and condenser, said header being adapted to permit intermingling of the condensed acid with the residual acid and being provided with an exit for the purified acid mixture resulting.

GEORGE W. BATCHELDER.
RALPH L. FEATHERER.
JESSE E. HUGHES.

CERTIFICATE OF CORRECTION.

Patent No. 2,366,309.   January 2, 1945.

GEORGE W. BATCHELDER, ET AL.

It is hereby certified that error appears in the printed specification of the above numbered patent requiring correction as follows: Page 2, second column, line 39, for the word "placed" read --packed--; and that the said Letters Patent should be read with this correction therein that the same may conform to the record of the case in the Patent Office.

Signed and sealed this 27th day of March, A. D. 1945.

Leslie Frazer
(Seal)   Acting Commissioner of Patents.

passage therethrough, a cooling section including a condenser, capable of cooling the volatilized constituents to a temperature below the boiling point of nitric acid, a header intermediate to said tubes and cooling section, said header being dammed to permit intermingling of the condensed material with the residual and being provided with an exit for the purified acid mixture resulting.

3. An apparatus adapted to the continuous purification of tetryl waste acid, said apparatus comprising means for feeding said acid at a controlled rate of flow including a constant level supply tank disposed at a level permitting gravity flow and a conduit leading therefrom, a plurality of acid-resistant tubes connected in parallel at their lower ends with said feeding means through said conduit, said tubes being provided with means for heating the acid during its upward passage therethrough, a cooling section including a condenser capable of cooling the volatilized constituents to a temperature below the boiling point of nitric acid and provided with an exit for the uncondensed gases, a header intermediate to said tubes and cooling section, said header being dammed to permit intermingling of the condensed material with the residual acid and being provided with an exit for the purified acid mixture resulting.

4. An apparatus adapted to the continuous purification of tetryl waste acid, said apparatus being provided with means for feeding the acid at a controlled rate of flow including a constant level supply tank disposed at a level permitting gravity flow and a conduit leading therefrom, a plurality of acid-resistant tubes connected in parallel at their lower ends to said feeding means through said conduit, said tubes being provided with means for heating the acid during its upward passage therethrough, a condenser adapted to cool the volatilized constituents to a temperature below the boiling point of nitric acid, a header intermediate to said tubes and condenser, said header being dammed to permit intermingling of said condensed material with the residual and being provided with an exit for the resulting acid mixture, a packed column between said header and said condenser.

5. An apparatus adapted for the continuous purification of tetryl waste acid, said apparatus comprising means for feeding said acid at a controlled rate of flow including a constant level supply tank disposed at a level permitting gravity flow and a conduit leading therefrom, said means being connected in parallel through said conduit to a plurality of acid-resistant tubes at their lower ends in such manner that the acid passes through said tubes in an upward direction, said tubes being provided with means for heating the acid during its passage therethrough and with dams situated in the upper extremities thereof for restricting the flow of liquids, a condenser capable of cooling the volatilized constituents to a temperature below the boiling point of nitric acid, thereby causing refluxing of the condensed nitric acid with the volatilized constituents, a header intermediate to said tubes and condenser, said header being adapted to permit intermingling of the condensed acid with the residual acid and being provided with an exit for the purified acid mixture resulting.

GEORGE W. BATCHELDER.
RALPH L. FEATHERER.
JESSE E. HUGHES.

CERTIFICATE OF CORRECTION.

Patent No. 2,366,309.     January 2, 1945.

GEORGE W. BATCHELDER, ET AL.

It is hereby certified that error appears in the printed specification of the above numbered patent requiring correction as follows: Page 2, second column, line 39, for the word "placed" read --packed--; and that the said Letters Patent should be read with this correction therein that the same may conform to the record of the case in the Patent Office.

Signed and sealed this 27th day of March, A. D. 1945.

Leslie Frazer
(Seal)     Acting Commissioner of Patents.